US011537471B2

(12) United States Patent
Lee et al.

(10) Patent No.: US 11,537,471 B2
(45) Date of Patent: Dec. 27, 2022

(54) MEMORY CONTROLLER, MEMORY SYSTEM INCLUDING THE SAME, AND METHOD OF OPERATING THE MEMORY CONTROLLER

(71) Applicant: SAMSUNG ELECTRONICS CO., LTD., Suwon-si (KR)

(72) Inventors: Jeongho Lee, Suwon-si (KR); Youngsik Kim, Suwon-si (KR); Seungyou Baek, Suwon-si (KR); Eunchu Oh, Suwon-si (KR); Youngkwang Yoo, Suwon-si (KR); Younggeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/469,377

(22) Filed: Sep. 8, 2021

(65) Prior Publication Data

US 2021/0406125 A1 Dec. 30, 2021

Related U.S. Application Data

(62) Division of application No. 16/840,581, filed on Apr. 6, 2020, now Pat. No. 11,144,393.

(30) Foreign Application Priority Data

Apr. 29, 2019 (KR) ........................ 10-2019-0049828

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0653* (2013.01); *G06F 3/0659* (2013.01); *G06F 3/0679* (2013.01)

(58) Field of Classification Search
CPC .. G06F 11/1076; G06F 3/0619; G06F 3/0653; G06F 3/0659; G06F 3/0679
See application file for complete search history.

(56) References Cited

U.S. PATENT DOCUMENTS

| 8,054,678 B2 | 11/2011 | Wang et al. |
| 8,972,649 B2 | 3/2015 | Davis et al. |
| 8,977,929 B2 | 3/2015 | Thiruvengadam et al. |

(Continued)

FOREIGN PATENT DOCUMENTS

| JP | 5923631 A | 8/2015 |
| KR | 10-2018-0087496 | 8/2018 |

*Primary Examiner* — Kyle Vallecillo
(74) *Attorney, Agent, or Firm* — Volentine, Whitt & Francos, PLLC

(57) ABSTRACT

A memory controller for controlling a memory operation of a memory device includes: an error correction code (ECC) circuit configured to detect an error of first read data read from the memory device and correct the error; an error type detection logic configured to write first write data to the memory device, compare second read data with the first write data, detect an error bit of the second read data based on a result of the comparing, and output information about an error type identified by the error bit; and a data patterning logic configured to change a bit pattern of input data to reduce an error of the second read data based on the information about the error type.

20 Claims, 12 Drawing Sheets

(56) References Cited

U.S. PATENT DOCUMENTS

| | | |
|---|---|---|
| 9,274,884 B2 | 3/2016 | Mateescu et al. |
| 9,582,354 B2 | 2/2017 | Kern et al. |
| 2012/0239996 A1 | 9/2012 | Higeta et al. |
| 2014/0157065 A1 | 6/2014 | Ong |
| 2014/0204671 A1 | 7/2014 | Sharon |
| 2014/0347923 A1 | 11/2014 | Ghaly et al. |
| 2015/0193304 A1 | 7/2015 | Katagiri et al. |
| 2016/0098316 A1* | 4/2016 | Lin .................. G06F 11/1012 714/764 |
| 2016/0164543 A1* | 6/2016 | Kumar ............. H03M 13/2942 714/755 |
| 2016/0342467 A1 | 11/2016 | Kumar et al. |
| 2017/0271002 A1 | 9/2017 | Sakhare |
| 2018/0011754 A1 | 1/2018 | Kwon et al. |
| 2018/0210669 A1 | 7/2018 | Lee |
| 2018/0343020 A1 | 11/2018 | Kumar et al. |
| 2019/0196896 A1 | 6/2019 | Wu et al. |

\* cited by examiner

| 1st read | 2nd read | Error Type | Stuck Value |
|---|---|---|---|
| Error | Error | Stuck Error | 0 |
| Error | Correct | Temporary Error | – |
| Correct | Correct | Normal Cell | – |
| Correct | Error | Stuck Error(hidden) | 1 |

MEMORY CONTROLLER, MEMORY SYSTEM INCLUDING THE SAME, AND METHOD OF OPERATING THE MEMORY CONTROLLER

CROSS-REFERENCE TO RELATED APPLICATION

This is a Divisional of U.S. application Ser. No. 16/840,581, filed Apr. 6, 2020, and a claim of priority is made to Korean Patent Application No. 10-2019-0049828, filed on Apr. 29, 2019, in the Korean Intellectual Property Office, the disclosures of which are incorporated herein in their entirety by reference.

BACKGROUND

The disclosure relates to a memory controller, and more particularly, to a memory controller for identifying errors in data written to memory cells and avoiding identified errors, a memory system including the memory controller, and a method of operating the memory controller.

As non-volatile memory devices, resistive memories such as phase change random access memory (PRAM), nano-floating gate memory (NFGM), polymer RAM (PoRAM), magnetic RAM (MRAM), ferroelectric RAM (FeRAM), resistive RAM (RRAM), etc. are well known in the art in addition to flash memories. A resistive memory has a non-volatile characteristic of a flash memory, as well as a high-speed property of dynamic RAM (DRAM).

When a memory cell of a non-volatile memory device wears out, a data bit may be stuck to 0 or 1. In this case, in response to a read request of a host, a data bit having a value different from that of the data bit that has been previously written may be read out. For example, even if 0 is written to a memory cell in which a data bit is stuck to 1, 1 may be read out in response to the read request.

SUMMARY

The disclosure provides a memory controller for determining the type of error in data written to a memory cell and avoiding a predetermined error, a memory system including the memory controller, and a method of operating the memory controller.

According to an aspect of the disclosure, there is provided a memory controller for controlling a memory operation of a memory device, the memory controller including: an error correction code (ECC) circuit configured to detect an error of first read data read from the memory device and correct the error; an error type detection logic configured to write first write data to the memory device, compare second read data with the first write data, detect an error bit of the second read data based on a result of the comparing, and output information about an error type identified by the error bit; and a data patterning logic configured to change a bit pattern of input data to reduce an error of the second read data based on the information about the error type, wherein the first write data is data in which the error of the first read data is corrected, and the second read data is data obtained reading the first write data written to the memory device.

According to another aspect of the disclosure, there is provided a method of operating a memory controller for controlling a memory device, the method including: reading first read data from the memory device; correcting bits of a first memory area in which an error has occurred in the first read data and inverting bits of a second memory area in which no error has occurred; identifying a first error type in the first memory area and a second error type, which is different from the first error type, in the second memory area; and writing second write data having a minimum error to the memory device, based on at least one of the first error type and the second error type.

According to another aspect of the disclosure, there is provided a memory system including: a memory device including a plurality of memory areas, each of the memory areas including at least one memory cell; and a memory controller configured to control a memory operation of the memory device, wherein the memory controller is configured to: read first read data stored in a first memory area and a second memory area from the memory device, perform a correcting operation on data of the first memory area in which an error has occurred in the first read data, perform an inverting operation on data of the second memory area in which no error has occurred in the first read data, generate first write data based on the correcting operation and the inverting operation, perform a comparing operation of comparing the first write data with second write data obtained by reading the first write data, and identify a plurality of error types based on the comparing operation.

According to another aspect of the disclosure, there is provided a memory system having a memory device and a memory controller. The memory controller: identifies a first memory constituent within the memory device having a fault, modifies write data, received from a host device, to generate modified data based on the first memory constituent and the fault, and stores the modified data in the memory device such that a first value within the modified data is stored in the first memory constituent. The memory controller modifies the write data to increase a likelihood that the first value matches a value produced by the fault.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Hereinafter, embodiments of the disclosure will be described in detail with reference to the accompanying drawings.

Figure 1:
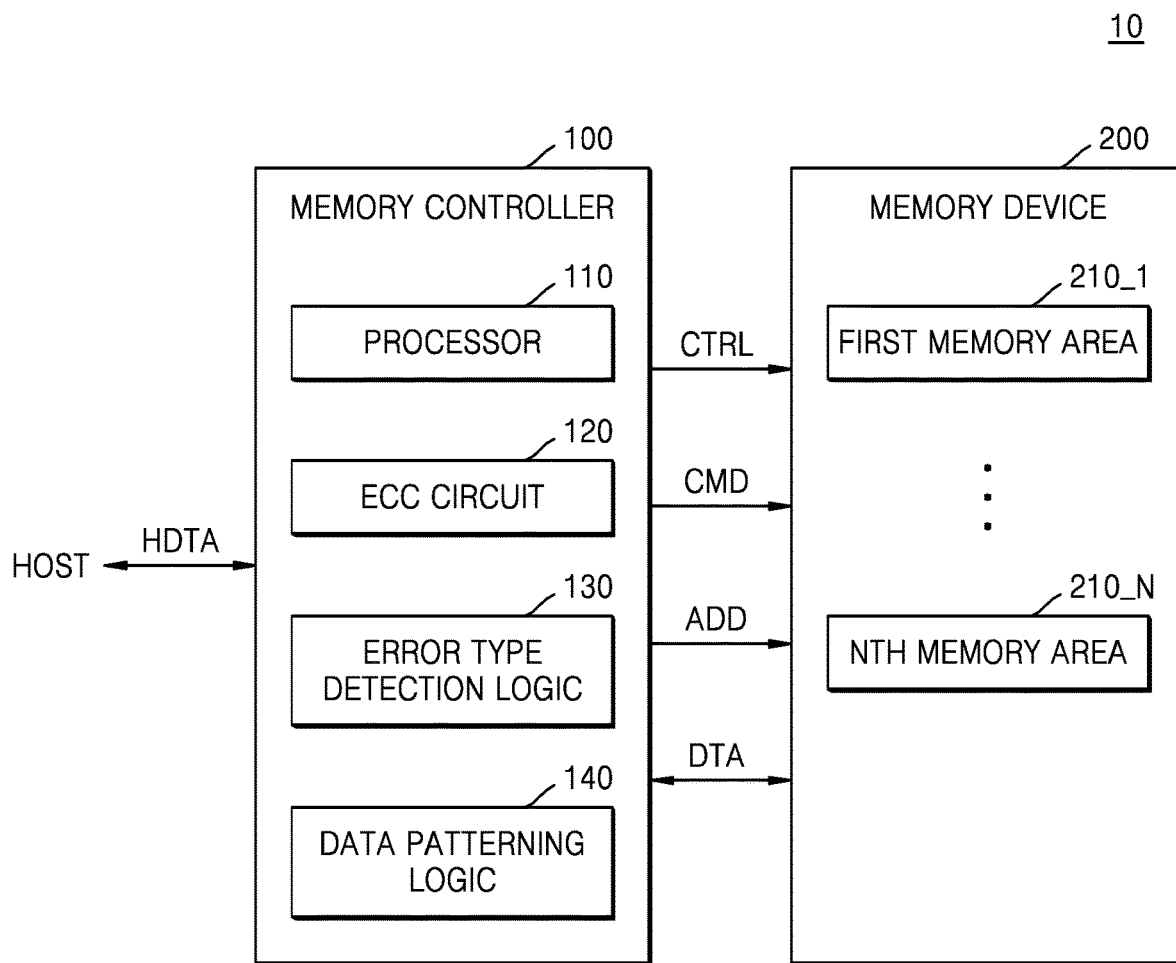
FIG. 1 is a block diagram of a memory system according to an embodiment of the disclosure.

FIG. 1 is a block diagram of a memory system 10 according to an embodiment of the disclosure.

Referring to FIG. 1, the memory system 10 may include a memory controller 100 and a memory device 200. The memory device 200 may include a plurality of memory areas, for example, first to Nth memory areas 210_1 to 210_N. The memory controller 100 may control the memory operation for the first to Nth memory areas 210_1 to 210_N. For example, a predetermined unit of data may be dispersedly written to the first to Nth memory areas 210_1 to 210_N or a predetermined unit of data may be read from the first to Nth memory areas 210_1 to 210_N. Each memory area may refer to one memory cell and may refer to a plurality of memory cells. For example, the memory area may refer to a plurality of memory cells, such as a bank, bay, tile, block, or page.

According to an embodiment of the disclosure, the memory device 200 may include a plurality of memory chips and each of the first to Nth memory areas 210_1 to 210_N may correspond to a memory chip. Each memory chip may include a memory cell array for storing data and a peripheral circuit for performing memory operations, for example, a write/read circuit and a control logic.

Each of the first to Nth memory areas 210_1 to 210_N may include a plurality of memory cells respectively arranged in areas where a plurality of first signal lines intersect with a plurality of second signal lines. In an embodiment, the plurality of first signal lines may be a plurality of bit lines and the plurality of second signal lines may be a plurality of word lines. Each of the plurality of memory cells may be a single level cell (SLC) storing one bit or may be a multi level cell (MLC) capable of storing data of two bits or more.

When data of one bit is written to one memory cell, the memory cells may have two resistance distributions according to the written data. Alternatively, when data of two bits is written to one memory cell, the memory cells may have four resistance distributions according to the written data. In another embodiment, in the case of a triple level cell (TLC) in which data of three bits is stored in one memory cell, the memory cells may have eight resistance distributions according to the written data. However, the disclosure is not limited thereto, and in other embodiments, the memory cells may include memory cells capable of storing data of four bits or more, respectively.

Each of the first to Nth memory areas 210_1 to 210_N may include resistive memory cells each including a variable resistive element. For example, when the variable resistance element is a phase change material (e.g., Ge—Sb—Te (GST)) and the resistance of the variable resistance element varies with temperature, the resistive memory device may be phase change random access memory (PRAM). As another example, when the variable resistive element includes an upper electrode, a lower electrode, and a complex metal oxide therebetween, the resistive memory device may be resistive RAM (RRAM). As another example, when the variable resistance element includes the upper electrode of a magnetic body, the lower electrode of the magnetic body, and a dielectric therebetween, the resistive memory device may be magnetic RAM (MRAM).

According to an embodiment of the disclosure, the memory device 200 may be referred to as a resistive memory device as the memory device 200 includes resistive memory cells. Alternatively, in an embodiment of the disclosure, the memory device 200 may include various types of memory cells and as the memory cells are arranged in areas where a plurality of first signal lines intersect with a plurality of second signal lines, the memory device 200 may be referred to as a cross-point memory device. It is assumed, in the following embodiments, that the memory device 200 is a resistive memory device, but embodiments of the disclosure are applicable to various types of memory devices in which data of a memory cell may be stuck to a certain value. As an example, the embodiments of the disclosure may be applied to various types of memory devices such as a volatile memory device and a flash memory device.

In various implementations, the memory device 200 may be a memory module in which a plurality of memory chips are mounted on a module board. Alternatively, the memory device 200 may be a semiconductor package including a plurality of memory chips and the memory chips may be stacked, in a die form, in the semiconductor package, and each of the first to Nth memory areas 210_1 to 210_N may be a memory chip included in the semiconductor package.

Alternatively, the memory device 200 may be one semiconductor chip including a plurality of semiconductor layers. In this case, each of the first to Nth memory areas 210_1 to 210_N may be a semiconductor layer. Alternatively, when the memory device 200 includes one semiconductor layer and the semiconductor layer includes a memory cell array including a plurality of cell blocks, each of the first to Nth memory areas 210_1 to 210_N may correspond to a cell block.

The memory controller 100 may include a processor 110, an error correction code (ECC) circuit 120, an error type detection logic 130, and a data patterning logic 140, and the memory controller 100 may control memory operations in a manner that is based on hardware, software, and a combination thereof. Hereinafter, the error type detection logic 130 may be referred to as a stuck bit detection logic.

The memory controller 100 may control the memory device 200 to read data stored in the memory device 200 or to write data to the memory device 200 in response to a write/read request from the host. Specifically, the memory controller 100 may control program (or a write), read, and erase operations for the memory device 200 by providing an address ADD, a command CMD, and a control signal CTRL to the memory device 200. In addition, data DTA to be written to the memory device 200 and data DTA read from the memory device 200 may be transmitted and received between the memory controller 100 and the memory device 200.

According to various embodiments, the memory controller 100 may include RAM, a host interface, and a memory interface. The RAM may be used as an operating memory of the processor 110. The processor 110 may control overall operations of the memory controller 100. The host interface may include a protocol for performing data exchange between the host and the memory controller 100. For example, the memory controller 100 may be configured to communicate with the host via at least one of various interface protocols, such as universal serial bus (USB), multi-media card (MMC), peripheral component interconnect-express (PCI-E), advanced technology attachment (ATA), serial-ATA, parallel-ATA, small computer system interface (SCSI), enhanced small device interface (ESDI), and integrated drive electronics (IDE).

The memory controller 100 may read first read data from the memory device 200. The ECC circuit 120 may perform error detection and error correction on the first read data. In addition, the ECC circuit 120 may transmit information about error-corrected data and a data bit with an error to the error type detection logic 130.

The error type detection logic 130 may output first write data, obtained by inverting some data bits included in received data, to the memory device 200 to write the first write data to the memory device 200. In addition, the error type detection logic 130 may read the first write data written to identify an error type. In this case, the read first write data is referred to as second read data. Data bits of the first write data and data bits of the second read data may be different from each other. For example, when some memory cells are worn out and data is in a stuck state, a stuck error may occur in some data bits of the first write data. That is, the stuck error may be an error that outputs the same value regardless of the value of data written to a memory cell due to a physical or structural change of the memory cell. For example, a data bit of 1 is written, but a data bit of 0 may be read. Therefore, by comparing the first write data with the second read data, a data bit having an error and a memory cell that caused the error may be identified. For example, the first write data may be stored in a memory internal or external to the error type detection logic 130 and the first write data may be read from the memory for comparison with the second read data. According to embodiments described below, the memory controller 100 may identify the type of error and a stuck value.

A temporary error may be caused by drift of distribution according to accumulation of memory operations, disturb between a read operation and a write operation, and the like. For example, when the memory controller 100 performs an operation (for example, reclaiming) of rewriting the same data to a memory cell included in the memory device 200, the temporary error may be resolved. As another example, a temporary error may indicate that a data bit with an error is output in a first reading process, but a normal bit is output in a second reading process performed after the first reading process.

The memory controller 100 may pattern data HDTA received from the host, based on information about the identified error type and information about a memory area where the error has occurred.

According to an embodiment, the data patterning logic 140 may randomize the received data HDTA based on a random seed. The randomized data may have a data bit in each of a plurality of memory areas. In this case, certain memory areas may be memory areas where stuck errors have occurred. Each of the memory areas where the stuck errors have occurred may have a predetermined stuck value. Therefore, when, among data bits included in the data randomized by the data patterning logic 140, data bits included in the memory area where the stuck error has occurred have a high degree of agreement with the stuck value, it may be seen that the error is reduced. That is, the data patterning logic 140 may reduce the error by selecting data having the highest degree of agreement with the stuck value from among the randomized data.

Then, the data patterning logic 140 may output selected randomized data to the memory device 200. In this case, the data patterning logic 140 may add parity for decoding the randomized data thereto.

Figure 2A:
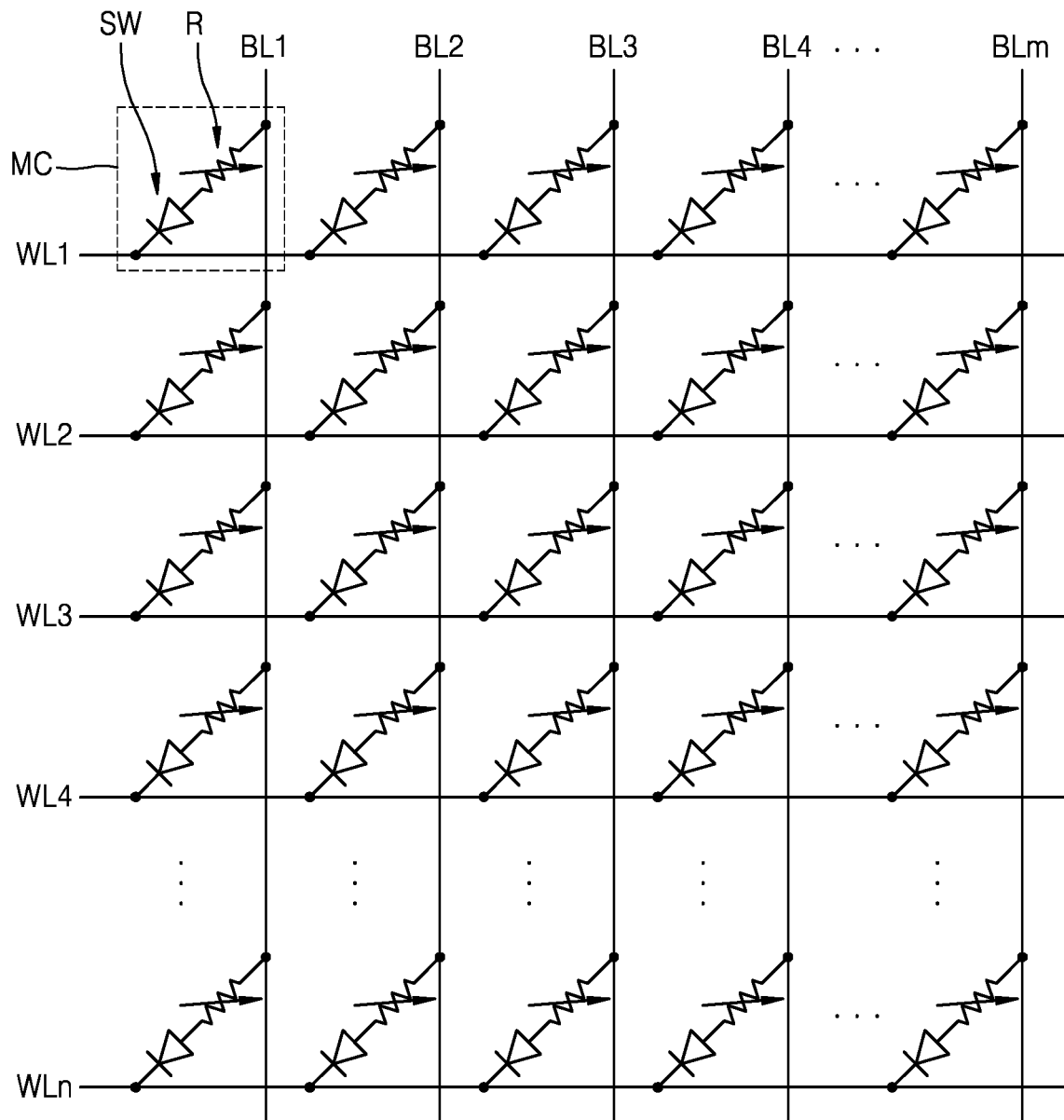
FIGS. 2A and 2B are diagrams for explaining a memory cell array according to an embodiment of the disclosure.
Figure 2B:
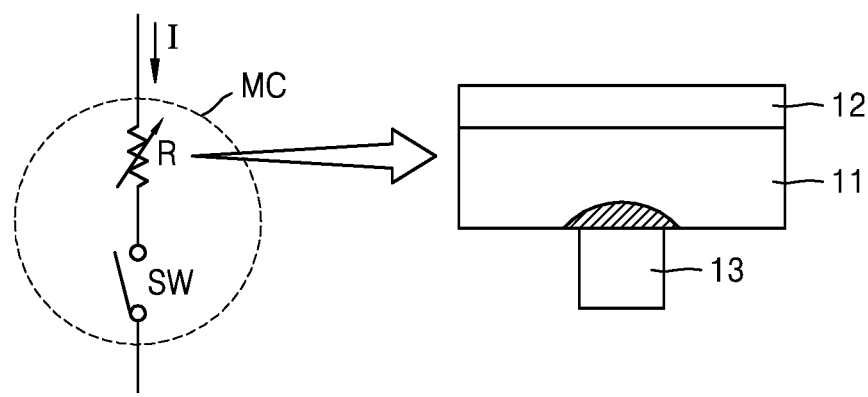

FIGS. 2A and 2B are views for explaining a memory cell array according to an embodiment of the disclosure. FIGS. 2A and 2B show an example in which the resistive memory cell is PRAM.

Referring to FIG. 2A, a memory cell array of a first memory area 210_1 corresponding to the first memory area 210_1 in FIG. 1 may be a two-dimensional memory cell array having a horizontal structure and may include a plurality of word lines WL1 to WLn, a plurality of bit lines BL1 to BLm, and a plurality of memory cells MC. The memory cell array may include a plurality of memory blocks. Each of the memory blocks may have a structure in which a plurality of memory cells is arranged in rows and columns. The number of word lines WL, the number of bit lines BL, and the number of memory cells MC may vary depending on embodiments. However, the disclosure is not limited thereto, and in another embodiment, the first memory area 210_1 may be a three-dimensional (3D) memory cell array having a vertical structure.

According to the present embodiment, each of the plurality of memory cells MC may include a variable resistance device R and a switching device SW. The variable resistance device R may be referred to as a variable resistance material, and the switching device SW may be referred to as a selection device.

In an embodiment, the variable resistance device R may be connected between one of the plurality of bit lines BL1 to BLm and the switching device SW, and the switching device SW may be connected between the variable resistance device R and one of the plurality of word lines WL1 to WLn. However, the disclosure is not limited thereto, and the switching device SW may be connected between one of the plurality of bit lines BL1 to BLm and the variable resistance device R and the variable resistance device R may be connected between the switching device SW and one of the plurality of word lines WL1 to WLn.

The switching device SW may be connected between one of the plurality of word lines WL1 to WLn and the variable resistance device R and may control supply of electric current to the variable resistance device R according to a voltage applied to the connected word line and the bit line. In FIG. 2A, the switching device SW is shown as a diode, but the disclosure is not limited thereto, and, according to another embodiment, the switching device SW may include another switching device.

Although FIG. 2A shows that the number of first to m-th bit lines BL1 to BLm is the same as the number of first to n-th word lines WL0 to WLn forming a plurality of memory tiles. In some embodiments, a memory tile may include 1024 or more bit lines BLs, and the memory tile may include more than twice as many the word lines WLs as the bit lines BLs.

Referring to FIG. 2B, the memory cell MC may include the variable resistance device R and the switching device SW. The switching device SW may include various devices such as a transistor, a diode, etc. The variable resistance device R may include a phase-change layer 11 including a mixture of germanium, antimony, and tellurium (Ge—Sb—Te (GST)), an upper electrode 12 on the phase-change layer 11, and a lower electrode 13 under the phase-change layer 11.

The upper and lower electrodes 12 and 13 may include various metals, metal oxides, or metal nitrides. The upper and lower electrodes 12 and 13 may include aluminum (Al), copper (Cu), titanium nitride (TiN), titanium aluminum nitride (TixAlyNz), iridium (Ir), platinum (Pt), silver (Au), polysilicon, tungsten (W), titanium (Ti), tantalum (Ta), tantalum nitride (TaN), tungsten nitride (WN), nickel (Ni), cobalt (Co), chrome (Cr), antimony (Sb), iron (Fe), molybdenum (Mo), palladium (Pd), tin (Sn), zirconium (Zr), zinc (Zn), iridium oxide ($IrO_2$), strontium oxide zirconate ($StZrO_3$), or the like.

The phase-change layer 11 may include a bipolar resistance memory material or a unipolar resistance memory material. The bipolar resistance memory material is programmed to a set state or a reset state according to a polarity of an applied electric current and may include Perovskite-based materials. The unipolar resistance memory material is programmed to a set state or a reset state by an electric current having the same polarity and may include transition metal oxide such as NiOx or TiOx.

The GST material may be programmed between an amorphous state having a relatively high resistivity and a crystalline state having a relatively low resistivity. The GST material may be programmed by heating the GST material. The magnitude and time of the heating may determine whether the GST material remains in an amorphous state or a crystalline state. The high resistivity and the low resistivity may be represented by programmed values, that is, logic 0 and logic 1, respectively, and may be detected by measuring the resistivity of the GST material. Conversely, the high resistivity and the low resistivity may be represented by programmed values, that is, logic 1 and logic 0, respectively.

In FIG. 2B, when a writing current I is applied to the memory cell MC, the writing current I flows through the lower electrode 13. When the writing current I is applied to the memory cell MC for a very short period of time, the applied writing current I adjacent to the lower electrode 13 is only heated by Joule's heat. Here, due to a variation in a heating profile, the phase-change layer 11 may be partially in a crystallized state (or set state) or a non-crystalline state (or reset state).

Figure 3:
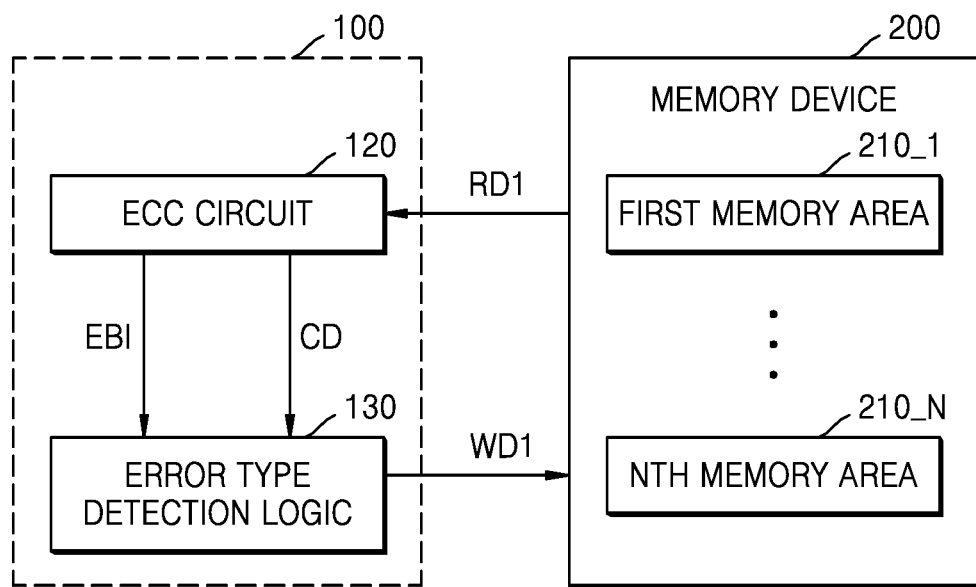
FIG. 3 is a diagram for explaining a process in which an error correction code (ECC) circuit and an error type detection logic cooperate with each other, according to an embodiment of the disclosure.

FIG. 3 is a diagram for explaining a process in which an ECC circuit and an error type detection logic cooperate with each other, according to an embodiment of the disclosure. The following description will be made with reference to FIG. 1 as well as FIG. 3.

The memory controller 100 may read first read data RD1 from the memory device 200. For example, the first read data RD1 may be data written to at least one of the first memory area 210_1 to the Nth memory area 210_N. The ECC circuit 120 may perform error detection and error correction operations on the first read data RD1. For example, the first read data RD1 may be a codeword in which data bits and parity bits are combined, and as another example, the first read data RD1 may include data bits. The first read data RD1 may be outputted based on a read command.

According to an embodiment of the disclosure, when error correction fails, the ECC circuit 120 may perform a read retry operation by entering defensive code. Furthermore, when the error correction is successful, the ECC circuit 120 may write first write data WD1 to the memory device 200 when the number of error bits exceeds a threshold old value. When the error correction is successful, the ECC circuit 120 may not write the first write data WD1 to the memory device 200 when the number of error bits is less than or equal to the threshold value. In this case, the ECC circuit 120 may determine that data is normally written to the memory device 200 to thereby keep the first read data RD1 in the memory device 200.

The ECC circuit 120 may perform error detection and error correction operations on the first read data RD1 and output error-corrected correction data CD. In addition, the ECC circuit 120 may identify a memory area (or the position of a memory area) where an error has occurred in a memory operation for the memory device 200 and output error bit information EBI. That is, the error bit information EBI may include various types of information which the ECC circuit 120 may derive as a result of performing error detection and error correction. The error bit information EBI may be included in stuck bit information. For example, the error bit information EBI may include information about a memory area (or the position of a memory area) where an error has occurred in the first read data RD1, information about an error value, and the like.

The error type detection logic 130 may output the first write data WD1 in response to receiving the correction data CD and the error bit information EBI. Specifically, the error type detection logic 130 may generate first write data WD1 that is inverted data of data (data included in the correction data CD) of another memory area other than an error-corrected memory area from among a plurality of memory areas. For example, the first read data RD1 may be [0, 1, 1, 0, 1] composed of 5 bits and the correction data CD may be [1, 0, 1, 0, 1] in which two bits of error are corrected. The first write data WD1 may be [1, 0, 0, 1, 0] in which the last three bits on which an error correction operation has not been performed are inverted. The above-mentioned bits and the number of bits are for convenience of explanation and the disclosure is not limited thereto. The error type detection logic 130 generates stuck bit information, which includes error bit information EBI and error type information, based on a result of performing a plurality of read and/or write operations of the memory device 200.

The memory controller 100 may write the first write data WD1 to the memory device 200. Then, error types may be detected by comparing second read data RD2 (see FIG. 4), obtained by reading the first write data WD1 written to the memory device 200, with the first write data WD1. This is described below with reference to FIG. 4.

Figure 4:
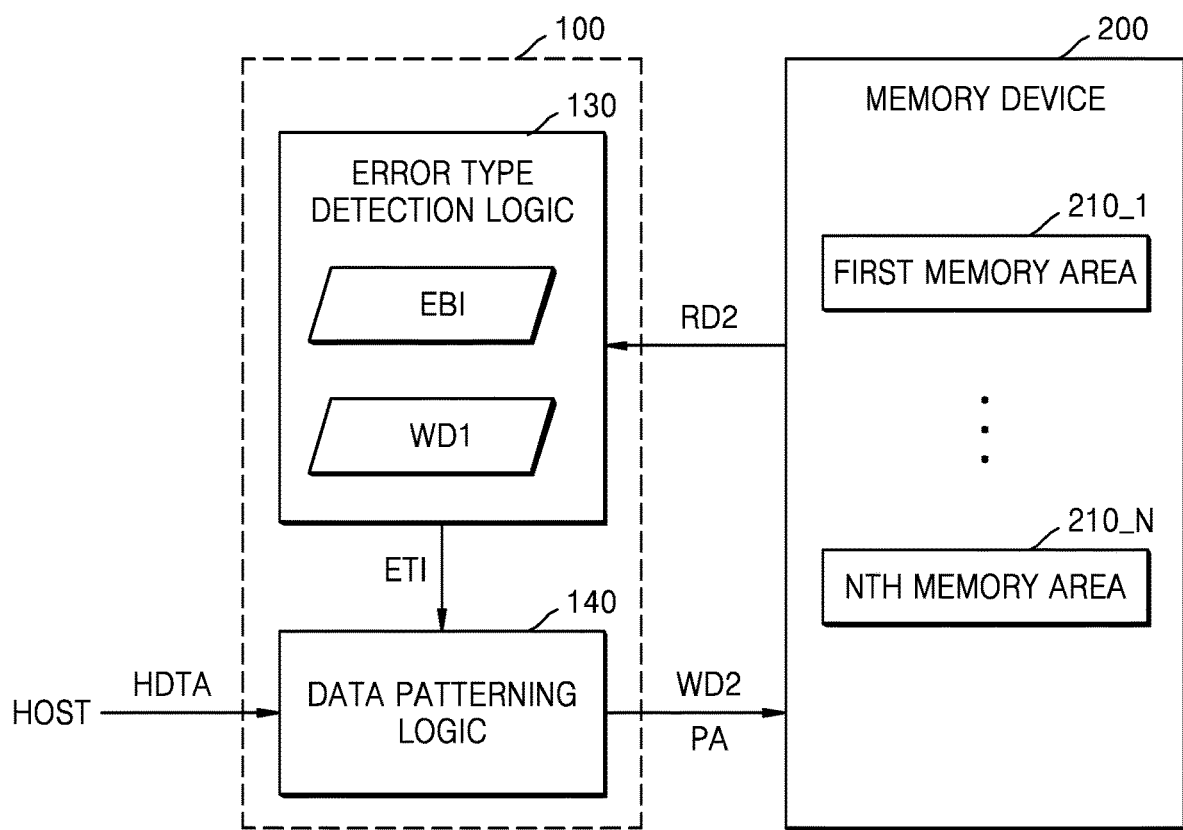
FIG. 4 is a diagram for explaining a process in which an error type detection logic and a data patterning logic cooperate with each other, according to an embodiment of the disclosure.

FIG. 4 is a diagram for explaining a process in which an error type detection logic and a data patterning logic cooperate with each other, according to an embodiment of the disclosure.

Referring to FIG. 4, the memory controller 100 may read the second read data RD2 by transmitting a read command to the memory device 200 to read data in a memory area in which the first write data WD1 is stored. In this case, although the second read data RD2 is data obtained by reading the data in the memory area in which the first write data WD1 is stored, the second read data RD2 and the first write data WD1 may be different from each other due to various errors. For example, an error may occur in at least one of data bits of the second read data RD2, and thus, the second read data RD2 and the first write data WD1 may be different from each other.

The error type detection logic 130 may perform an operation of comparing the second read data RD2 to the first write data WD1 and identify the error type of the second read data RD2 based on the error bit information EBI. For example, the error type detection logic 130 may identify an error type for each data bit included in the second read data RD2. As another example, by identifying the error type for each data bit included in the second read data RD2, the error type of a memory area corresponding to a data bit where an error has occurred may be identified.

The error type detection logic 130 may output error type information ETI, which is information about the identified error type. The error type information ETI may include information about the second read data RD2 and an error type related to at least one memory area included in the memory device 200. For example, the error type information ETI may include information about the type of error that occurred in each memory cell storing a data bit. The error type information ETI may be included in stuck bit information. The error type may include a stuck error, a temporary error, and a hidden stuck error, and each memory cell may be a normal cell or may have one of the error types. A method of identifying the error types will be described later with reference to FIGS. 5 and 6 and the like.

The data patterning logic 140 may randomize data HDTA received from the host, based on the error type information ETI. For example, the data HDTA may be new data to be written to the memory device 200. The data patterning logic 140 may select second write data WD2, which includes the least error, of randomized data and write the second write data WD2 to the memory device 200. According to an embodiment, a parity PA for decoding the randomized data may be generated. For example, the data patterning logic 140 may add the parity PA to the second write data WD2 and transmit the second write data WD2 with the parity PA to the memory device 200. Details will be described later with reference to FIGS. 7 and 8 and the like.

Figures 5, 6:
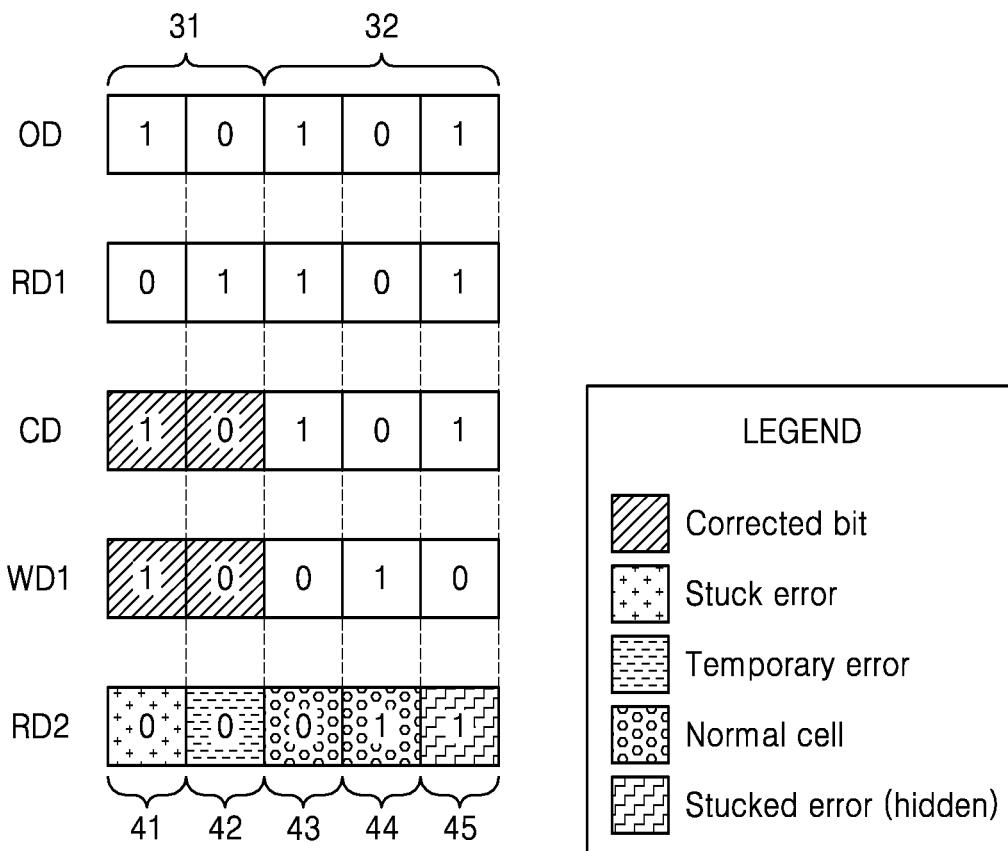
FIG. 5 is a diagram for explaining data communicated in a memory system according to an embodiment of the disclosure.
FIG. 6 is a diagram for explaining error types and stuck values, which are identified according to errors generated in first read data and second read data, according to an embodiment of the disclosure.

FIG. 5 is a diagram for explaining data communicated in a memory system according to an embodiment of the disclosure. The following description will be made with reference to the above-mentioned drawings as well as FIG. 5. Although FIG. 5 shows an example in which each data includes five bits and each data bit is 0 or 1, the disclosure is not limited thereto. The following description will be made with reference to FIG. 1 as well as FIG. 5.

According to an embodiment of the disclosure, original data OD written to the memory device 200 may be [1, 0, 1, 0, 1]. The memory controller 100 may read the first read data RD1 based on a read request or an error detection request from the host. For example, the first read data RD1 may be [0, 1, 1, 0, 1].

An error may occur in data included in a first memory area 31 of the first read data RD1, and an error may not occur in data included in a second memory area 32 of the first read data RD1. For example, the first memory area 31 may be an area including first and second data bits, and the second memory area 32 may be an area including remaining data bits. In this case, the ECC circuit 120 may detect that an error has occurred in data included in the first memory area 31 and perform error correction by using a parity bit included in or outside the first read data RD1.

The ECC circuit 120 may perform error detection and error correction on the first read data RD1 and output the correction data CD. Specifically, the ECC circuit 120 may correct an error included in the first memory area 31 and maintain data included in the second memory area 32. For example, the correction data CD may be [1, 0, 1, 0, 1] and may be the same as the original data OD.

The error type detection logic 130 may generate the first write data WD1. Specifically, the error type detection logic 130 may maintain data of the first memory area 31, which is error-corrected in the correction data CD. In addition, the error type detection logic 130 may invert data of the second memory area 32, which is not error-corrected in the correction data CD. For example, the data bits [1, 0, 1], which are not error-corrected in the correction data CD, may be inverted to [0, 1, 0] and the inversion data bits may be included as part of the first write data WD1. The error type detection logic 130 may generate the first write data WD1 to perform an operation of comparing the first write data WD1 with the second write data WD2.

The error type detection logic 130 may output the first write data WD1 to be written to the memory device 200. Then, the memory controller 100 may read the second read data RD2 based on a request received from the host or a signal generated in the memory controller 100. The memory controller 100 may identify a position where the first write data WD1 is written to the memory device 200 and read the second read data RD2 that is data contained in the position. For example, the memory controller 100 may read the second read data RD2 based on the address ADD of the memory device 200 at which the first write data WD1 is written. Specifically, the error type detection logic 130 may compare data bits located at the same address ADD to each other.

The error type detection logic 130 may perform a comparison operation of comparing the first write data WD1 with the second read data RD2. According to an embodiment, the comparison operation may include a first partial comparison operation and a second partial comparison operation. The first partial comparison operation may be an operation of comparing the data of the first memory area 31 of the first write data WD1 to the data of the first memory area 31 of the second read data RD2. The second partial comparison operation may be an operation of comparing the data of the second memory area 32 of the first write data WD1 to the data of the second memory area 32 of the second read data RD2.

According to an embodiment of the disclosure, the error type detection logic 130 may compare data bits included in the first memory area 31 of the first write data WD1 to data bits included in the first memory area 31 of the second read data RD2. Referring to FIG. 5, the data bits of the first memory area 31 of the first write data WD1 may be [1, 0], and the data bits of the first memory area 31 of the second read data RD2 may be [0, 0].

The error type detection logic 130 may identify that a stuck error has occurred in a memory cell corresponding to a first partial area 41. Specifically, this is because, in the first partial area 41, the data bit [0] of the first read data RD1 and the data bit [1] of the original data OD are different from each other and the data bit [0] of the second read data RD2 read again after the first read data RD1 is read is also different from the data bit [1] of the first write data WD1. Each of a plurality of partial areas, that is, first to fifth partial areas 41 to 45, may correspond to one memory cell, or may correspond to a plurality of memory cells. An operation of comparing the first write data WD1 with the second read data RD2 may be referred to as a comparison operation, and an operation of comparing a partial area (e.g., the first partial area 41) of the first write data WD1 with a partial area, which is identical to the partial area of the first write data WD1, of the second read data RD2 may be referred to as a partial comparison operation.

The error type detection logic 130 may identify that a temporary error has occurred in a memory cell corresponding to the second partial area 42. Specifically, this is because, in the second partial area 42, the data bit [1] of the first read data RD1 and the data bit [0] of the original data OD are different from each other but the data bit [0] of the second read data RD2 read again after the first read data RD1 is read is the same as the data bit [0] of the first write data WD1. That is, the temporary error may be an error that occurs only temporarily in a process of reading the first read data RD1.

The error type detection logic 130 may identify that memory cells corresponding to the third partial area 43 and the fourth partial area 44 are normal. This is because no error has occurred in any of the first read data RD1 and the second read data RD2.

The error type detection logic 130 may identify that a stuck error has occurred in a memory cell corresponding to the fifth partial area 45. For example, the memory cell of the fifth partial region 45 may be identified as a memory cell in which a hidden stuck error, in which a data bit is stuck to 1, has occurred. The hidden stuck error may be a kind of stuck error. In the fifth partial area 45, the data bit of the original data OD may be [1] and the data bit of the first read data RD1 obtained by reading the original data OD written in the memory device 200 may also be [1]. However, in the fifth partial area 45, even if the data bit of the first write data WD1 is [0], the data bit of the second read data RD2 obtained by reading the first write data WD1 written in the memory device 200 may be [1]. That is, the error type detection logic 130 generates the first write data WD1 by inverting some data of the correction data CD, to identify the hidden stuck error.

According to embodiments of the disclosure, the memory controller 100 may identify whether the memory device 200 has an error, may identify a plurality of error types including a stuck error and a temporary error, and may also identify a hidden stuck error that is difficult to detect in a first reading process. As the memory controller 100 identifies various error types, the memory controller 100 may perform an operation of reducing errors occurring in the memory device 200 based on the identified error types. Accordingly, data reliability may be improved in a short time with only a single additional read operation and a simple comparison operation.

The memory controller 100 may: (1) write the second write data WD2 to the same memory cells of the memory device 200 from which it reads the second read data RD2; (2) read the second read data RD2 from the same memory cells of the memory device 200 in which it writes the first write data WD1; (3) write the first write data WD1 to the same memory cells of the memory device 200 from which it reads the first read data RD1; and (4) read the first read data RD1 from the same memory cells of the memory device 200 in which it writes the original data OD.

FIG. 6 is a diagram for explaining error types and stuck values, which are identified according to errors generated in the first read data RD1 and the second read data RD2, according to an embodiment of the disclosure.

According to an embodiment of the disclosure, the error type detection logic 130 may identify, as a cell having a stuck error, a memory cell corresponding to an erroneous data bit in a first read operation and a second read operation. The error type detection logic 130 may determine a stuck value of at least one memory cell in which data identified as a stuck error is stored. For example, the stuck value may be a value of a data bit at which a stuck error has occurred in the second read data RD2.

According to an embodiment of the disclosure, when a data bit at which an error has occurred in the first read operation does not have an error in the second read operation, the error type detection logic 130 may identify a memory cell including the data bit as a cell having a temporary error. In addition, the error type detection logic 130 may identify, as a normal cell, a memory cell corresponding to a data bit at which no error has occurred in the first read operation and the second read operation.

According to an embodiment of the disclosure, when a data bit at which no error has occurred in the first read operation has an error in the second read operation, the error type detection logic 130 may identify a memory cell including the data bit as a cell having a hidden stuck error. For example, the stuck value may be a value of a data bit at which a hidden stuck error has occurred in the second read data RD2.

In an example, the error type detection logic 130 may store code for performing a series of operations to identify the error type and the stuck value. According to an embodiment, a memory (e.g., SRAM) may be included in or outside the error type detection logic 130 and the code stored in the memory may be read to perform the series of operations. As another example, the error type detection logic 130 itself may be software implemented with at least one piece of code. As another example, the error type detection logic 130 may perform a series of operations in a form (e.g., firmware) in which hardware and software are combined with each other. As another example, the error type detection logic 130 may identify the error type and the stuck value based on a look-up table that is the same as or similar to that shown in FIG. 6.

Figure 7:
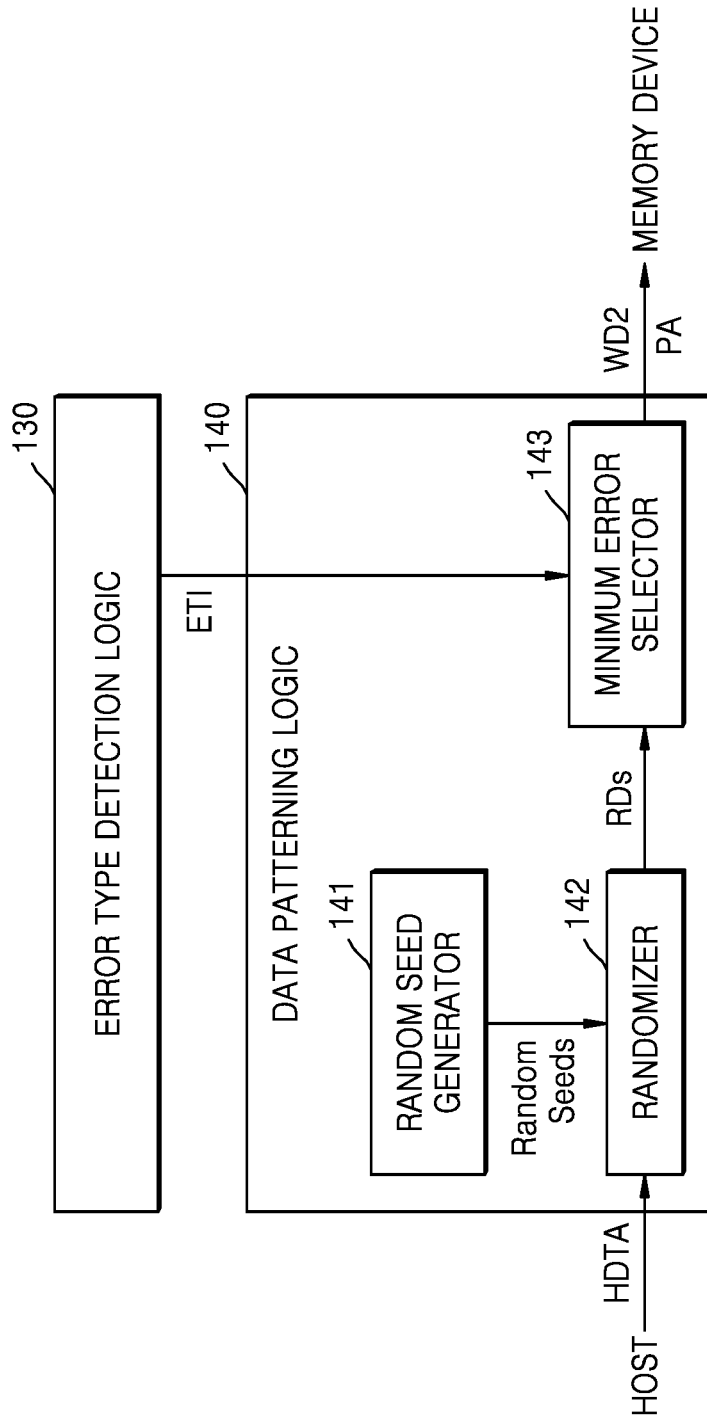
FIG. 7 is a block diagram for explaining a data patterning logic according to an embodiment of the disclosure.
Figure 8:
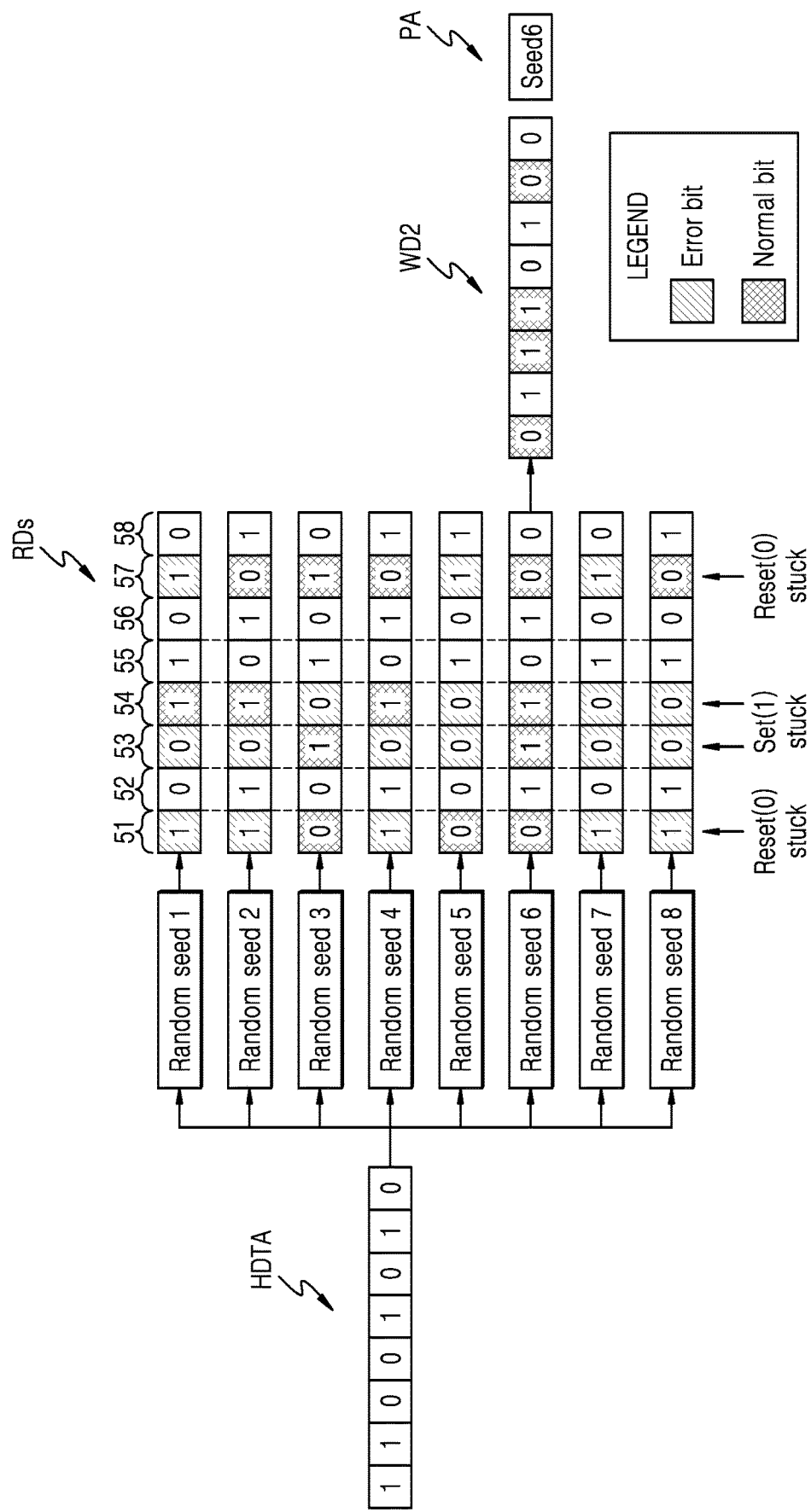
FIG. 8 is a diagram for explaining an operation in which a memory system randomizes data received from a host and writes the randomized data to a memory device, according to an embodiment of the disclosure.

FIG. 7 is a block diagram for explaining a data patterning logic 140 according to an embodiment of the disclosure, and FIG. 8 is a diagram for explaining an operation in which a memory system randomizes data received from a host and writes the randomized data to a memory device, according to an embodiment of the disclosure.

Referring to FIGS. 7 and 8, the data patterning logic 140 may include a random seed generator 141, a randomizer 142, and a minimum error selector 143.

The random seed generator 141 may generate a plurality of random seeds used for randomizing data HDTA received from the host. For example, the random seeds may be fixed values or values that vary over time and may be values generated by random number generation. Furthermore, each of the plurality of random seeds may be applied to the received data HDTA, and a plurality of pieces of random data RDs may be generated by the number of random seeds. For example, as shown in FIG. 8, eight random seeds may be generated by the random seed generator 141 and eight pieces of random data RDs may be generated by the randomizer 142. The random seed generator 141 may store the generated random seeds. For example, information about the stored random seeds may be used to generate parity PA, and the parity PA may be used for de-randomizing (or decoding).

The randomizer 142 may randomize the received data HDTA based on the random seeds. The randomizer 142 may output the random data RDs to the minimum error selector 143. For example, the randomizer 142 may randomize the received data HDTA [1, 1, 0, 0, 1, 0, 1, 0] based on different random seeds and output different random data RDs. Data bits corresponding to first to eight partial areas 51 to 58 may be different between the different pieces of random data RDs. For example, the randomizer 142 may generate first random data having data of [1, 0, 0, 1, 1, 0, 1, 0] based on a first random seed and may generate second random data having data of [1, 1, 0, 1, 0, 1, 0, 1], which is different from the first random data, based on a second random seed. Each of the first to eight partial areas 51 to 58 may correspond to one memory cell, or may correspond to a plurality of memory cells.

The minimum error selector 143 may generate second write data WD2 based on the error type information ETI and the random data RDs. According to an embodiment, the minimum error selector 143 may generate parity PA for derandomizing (or decoding) the second write data WD2.

The minimum error selector 143 may select random data having the smallest error from among the pieces of random data RDs. For example, the minimum error selector 143 may select random data with the smallest stuck error, or may select random data with no stuck error. For example, the minimum error selector 143 may select sixth random data generated based on a sixth random seed from among the pieces of random data RDs. In the sixth random data, the first partial area 51, the third partial area 53, the fourth partial area 54, and the seventh partial area 57 have values 0, 1, 1, and 0, respectively. This is because memory cells corresponding to the first, third, fourth, and seventh partial areas 51, 53, 54, and 57 are stuck to have the stuck values of 0, 1, 1, and 0, and thus, the sixth random data may be data with no error. Therefore, the minimum error selector 143 may select the sixth random data.

For the sake of understanding, in the opposite case, when the memory controller 100 writes third random data generated based on a third random seed to the memory device 200, data to be written to the memory device 200 may be [0, 0, 1, 0, 1, 0, 1, 0]. However, data to be read from the memory device 200 may be [0, 0, 1, 1, 1, 0, 1, 0]. That is, a stuck error may occur in the data to be read due to a set stuck memory cell corresponding to the fourth partial area 54. Therefore, the minimum error selector 143 may select the sixth random data instead of the third random data.

According to an embodiment of the disclosure, the minimum error selector 143 may identify the address of memory cells into which the data of the first to eight partial areas 51 to 58 included in each of the pieces of random data RDs are to be written. Alternatively, the minimum error selector 143 may identify the address of memory cells into which the data HDTA received from the host is to be written. The minimum error selector 143 may determine whether a memory cell corresponding to the identified address is in an error state. In this case, the minimum error selector 143 may determine whether the memory cell is in an error state, based on the error type information ETI received from the error type detection logic 130. For example, the error type information ETI may include error types of memory cells, the position of a memory cell where an error has occurred, an error value, a stuck value, and the like. The minimum error selector 143 may refer to a stuck value of a memory cell corresponding to each of the first to eight partial areas 51 to 58 in the pieces of random data RDs and select random data in which a partial area corresponding to a memory cell with a stuck error has a data bit that matches the stuck value.

According to an embodiment of the disclosure, the minimum error selector 143 may output random data selected as the second write data WD2. The memory controller 100 may write the second write data WD2 to the memory device 200. For example, when the sixth random data is selected as the second write data WD2, the parity PA may be generated based on the sixth random seed. The generated parity PA may be used to derandomize (or decode) the second write data WD2 when the host wants to read the second write data WD2.

According to an embodiment of the disclosure, the data patterning logic 130 randomizes data HDTA. The data patterning logic 130 selects a first randomized data among a plurality of a random data RDs based on the error type information ETI. Data bits of the first randomized data include more data bits corresponding to a stuck bit than data bits of the first write data WD1.

Figure 9:
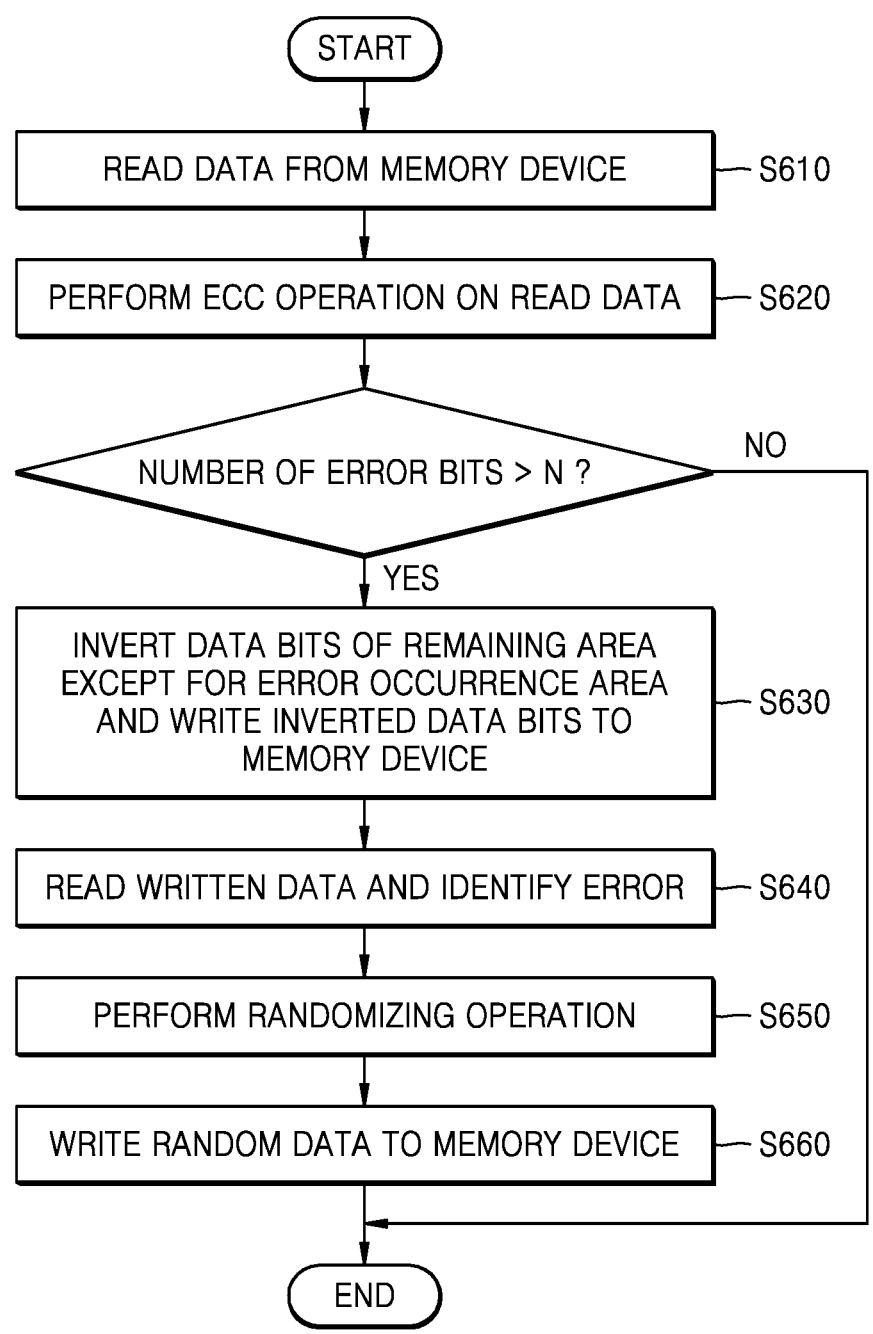
FIG. 9 is a flowchart illustrating a method of operating a memory controller, according to an embodiment of the disclosure.

FIG. 9 is a flowchart illustrating a method of operating a memory controller, according to an embodiment of the disclosure. The following description will be made with reference to the above-mentioned drawings as well as FIG. 9.

According to an embodiment of the disclosure, the memory controller 100 may read data from the memory device 200 (S610). In this case, the memory controller 100 may read the first read data RD1, and at least some of the first read data RD1 may be different from the original data RD written in the memory device 200, due to various types of errors.

The memory controller 100 may perform an ECC operation on the read data (S620). For example, the ECC circuit 120 may perform error detection and error correction operations on the first read data RD1. As another example, an error of the first read data RD1 may be detected and corrected by an ECC engine included in the outside of the memory controller 100.

When the number of error bits included in the data read from the memory device 200 exceeds a threshold value, the memory controller 100 may invert data bits of the remaining area except for an error occurrence area and write the inverted data bits into the memory device 200 (S630). For example, referring to FIG. 5, the memory controller 100 may invert data included in the second memory area 32 of the correction data CD on which error detection and error correction have been performed, and write the inverted data into the memory device 200. The inversion operation is performed to identify a hidden stuck error in subsequent operations.

Referring back to FIG. 9, the memory controller 100 may read the written data from the memory device 200 and identify an error (S640). For example, information about the first write data WD1 written by the memory controller 100 may be stored in an internal memory and the second read data RD2 read from the memory device 200 may be compared to the first write data WD1 to identify an error. An embodiment for identifying an error will be described later with reference to FIG. 11.

The memory controller 100 may perform a randomizing operation (S650). For example, the memory controller 100 may randomize input data received from the host and may select random data, in which data to be written to the memory device 200 has a minimum error, based on the identified error. Then, the memory controller 100 may write the selected random data to the memory device 200 (S660). Operations S610 to S640 will be described later with reference to FIGS. 10 and 11, and operations S650 and S660 will be described later with reference to FIG. 12.

Figure 10:
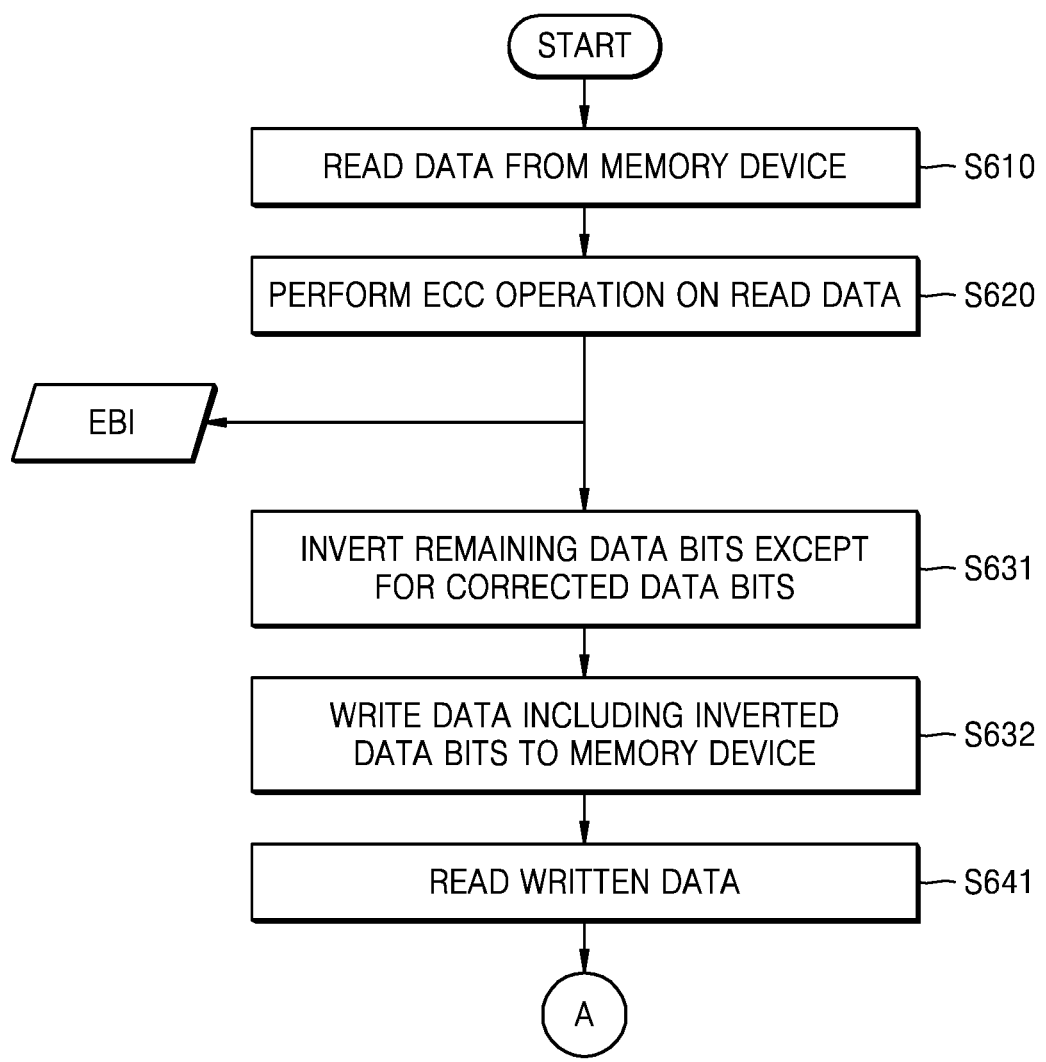
FIGS. 10 and 11 are flowcharts illustrating a method of operating a memory controller to determine an error type of data written to a memory cell, according to an embodiment of the disclosure.
Figure 11:
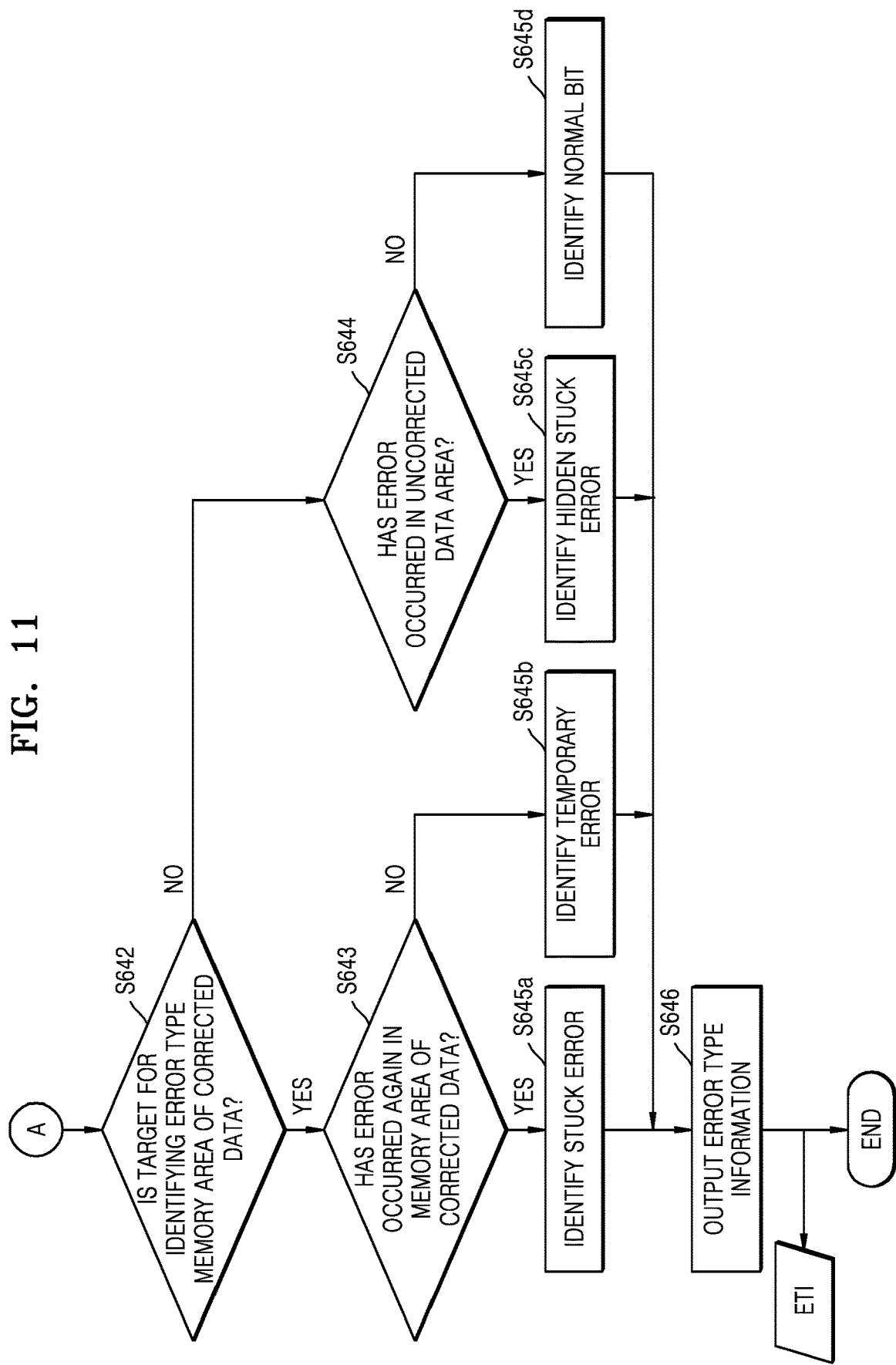

FIGS. 10 and 11 are flowcharts illustrating a method of operating a memory controller to determine an error type of data written to a memory cell, according to an embodiment of the disclosure. The following description will be made with reference to the above-mentioned drawings as well as FIGS. 10 and 11.

Referring to FIG. 10, the memory controller 100 may read data from the memory device 200 (S610) and may perform error detection and error correction operations on the read data (S620).

According to an embodiment of the disclosure, the memory controller 100 may output error bit information EBI about an error included in the first read data RD1 by performing error detection and error correction operations. For example, the error bit information EBI may include a position of a memory cell where an error has occurred, a position of a data bit at which an error has occurred in a data string, an error value, and an error-corrected correction value.

According to an embodiment of the disclosure, the memory controller 100 may invert remaining data bits except for corrected data bits (S631). For example, based on the error bit information EBI, the first write data WD1 may be generated by inverting remaining data bits except for some corrected data bits in the correction data CD.

According to an embodiment of the disclosure, the memory controller 100 may write data including the inverted data bits to the memory device 200 (S632). For example, the memory controller 100 may output the first write data WD1 to be written to the memory device 200. Some of the data bits of the first write data WD1 may include inverted data bits in the correction data CD and the remaining data bits of the first write data WD1 may be the same as the bits of the correction data CD.

According to an embodiment of the disclosure, the memory controller 100 may read the written data (S641). For example, the memory controller 100 may store information (for example, address) about the position of the memory device 200 in which the first write data WD1 is written, and may transmit, to the memory device 200, a read command for reading data of the position in which the first write data WD1 is written.

According to an embodiment of the disclosure, the memory controller 100 may perform a comparison operation of comparing data written to the memory device 200 with data read from the memory device 200. For example, the memory controller 100 may compare the first write data WD1 with the second read data RD2 to identify error types.

According to an embodiment of the disclosure, the memory controller 100 may identify whether a target for identifying an error type is a memory area of corrected data in the first write data WD1 and the second read data RD2 (S642). For example, the memory controller 100 may identify a memory area (e.g., the first memory area 31 in FIG. 5), in which an error is corrected, in the correction data CD.

When an error occurs again in the data of a memory area in which an error is corrected (S643), the memory controller 100 may identify, as a stuck error, the bit of an area in which the error has occurred (S645a). When an error does not occur in the data of a memory area in which an error is corrected, the memory controller 100 may identify, as a temporary error, the bit of an area in which no error has occurred (S645b). This is because the error is an error occurring only in a first reading process.

When an error occurs again in the data of a memory area in which an error is not corrected (S644), the memory controller 100 may identify, as a hidden stuck error, the bit of an area in which an error has occurred (S645c). This is because the error is an error occurring only in a second reading process. When an error does not occur in the data of a memory area in which an error is not corrected, the memory controller 100 may identify, as a normal bit, the bit of an area in which an error has not occurred (S645d).

The memory controller 100 may output information about an error associated with the memory device 200 and data read therefrom, obtained through a series of operations. That is, the memory controller 100 may output error type information (ETI) (S646).

Figure 12:
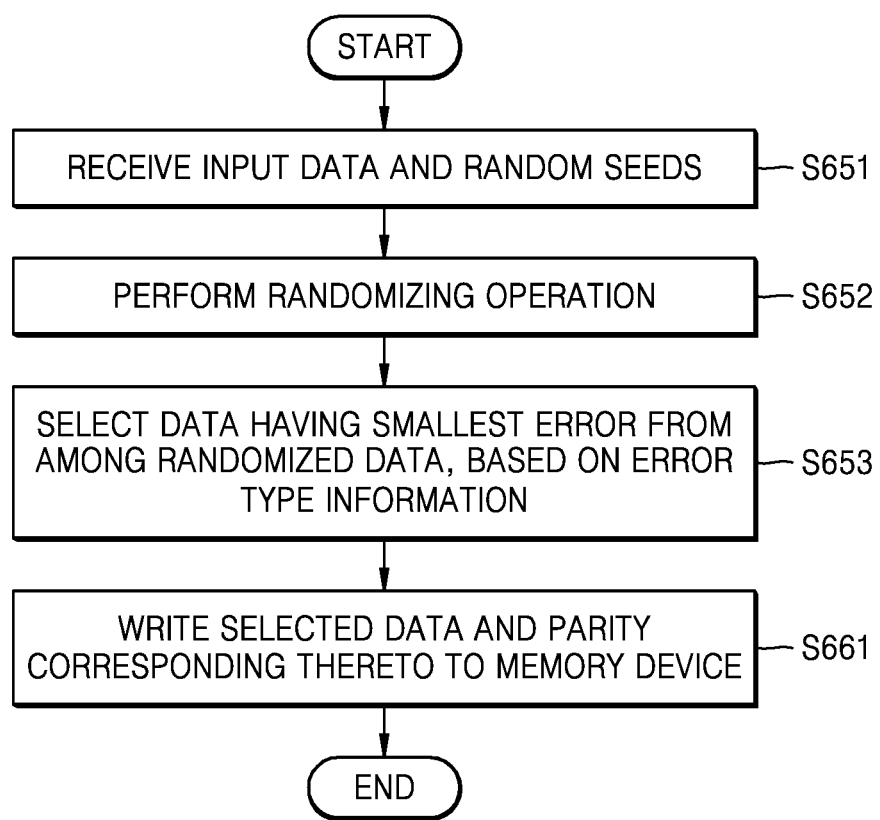
FIG. 12 is a flowchart illustrating a method of operating a memory controller to randomize, based on an error type, data received from a host, according to an embodiment of the disclosure.

FIG. 12 is a flowchart illustrating a method of operating a memory controller to randomize, based on an error type, data received from a host, according to an embodiment of the disclosure. The following description will be made with reference to the above-mentioned drawings as well as FIG. 12.

Referring to FIG. 12, the memory controller 100 may receive data HDTA from the host and random seeds (S651). The memory controller 100 may perform a randomizing operation to randomize the data HDTA, received from the host, based on the random seeds (S652). As a result of performing the randomizing operation, a plurality of pieces of random data RDs may be output According to an embodiment of the disclosure, the memory controller 100 may select data having the smallest error from among the randomized data, based on the error type information (ETI) (S653). For example, when at least some data bits included in the pieces of random data RD are written to a memory cell in which a stuck error has occurred, the memory controller 100 may select random data in which the at least some data bits match a stuck value of the memory cell.

According to an embodiment of the disclosure, the memory controller 100 may write the selected data and parity corresponding thereto to the memory device 200 (S661). For example, the memory controller 100 may write the second write data WD2 to the memory device 200 and the parity PA may be data bits for derandomizing (or decoding) the second write data WD2.

Figure 13:
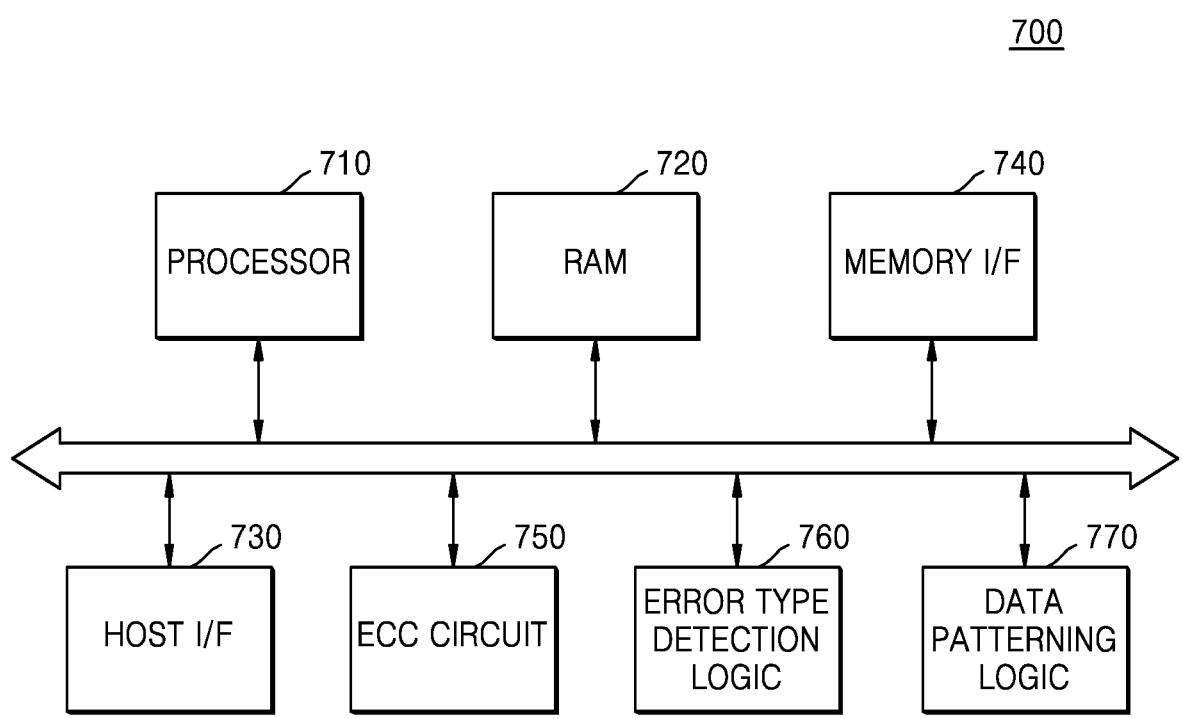
FIG. 13 is a block diagram of a memory controller according to an embodiment of the disclosure.

FIG. 13 is a block diagram of a memory controller 700 according to an embodiment of the disclosure.

Referring to FIG. 13, the memory controller 700 may include a processor 710, a RAM 720, a host interface 730, a memory interface 740, an ECC circuit 750, an error type detection logic 760, and a data patterning logic 770. As an embodiment, the memory controller 700 may be a device included in an application process (AP, not shown) that may be implemented as a system-on-chip. In addition, the error type detection logic 760 and the data patterning logic 770 may further include configurations described with reference to the drawings described above.

The processor 710 may include a central processing unit or a micro-processor and may control overall operations of the memory controller 700. For example, the processor 710 may be configured to drive software or firmware for controlling the memory controller 700 and the software or the firmware may be loaded on the RAM 720 to be operated. The RAM 720 may be used as an operation memory, a cache memory, or a buffer memory of the processor 710. The RAM 720 may temporarily store data that is to be written in the memory device or data read from the memory device.

The host interface 730 interfaces with the host to receive a request for memory operation from the host. For example, the host interface 730 receives various requests such as a read request, a write request of data, etc. from the host, and may generate various internal signals for performing memory operations on the memory device in response to the requests.

The memory interface 740 may provide an interface between the memory controller 700 and the memory device, for example, write data and read data may be transmitted to and received from the memory device via the memory interface 740. Also, the memory interface 740 may provide the memory device with commands and addresses and may receive various information from the memory device to provide the information to the inside of the memory controller 700.

The ECC circuit 750 may detect an error of read data through an ECC decoding process, and a result of detecting the error may be used in the operation of determining an error type in the error type detection logic 760. The data patterning logic 770 may generate a plurality of pieces of random data obtained by randomizing data received via the host interface 730. Based on information about an error type determined in the error type detection logic 760, the data patterning logic 770 may select random data with minimal error from among the pieces of random data. The selected random data may be output to the memory device 200 via the memory interface 740.

Various functions that may be performed by the error type detection logic 760 and the data patterning logic 770 may be implemented via hardware or software or a combination of the hardware and software. As an example, when a function is implemented via hardware, the function may be performed by a hardware circuit arranged in the inside of each of the error type detection logic 760 and the data patterning logic 770. Alternatively, when a function is implemented via software, a program provided in the inside or outside of each of the error type detection logic 760 and the data patterning logic 770 may be loaded on the RAM 720 and the processor 710 may execute the program to perform the function.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. A memory controller for controlling a memory operation of a memory device, the memory controller comprising:
   an error correction code (ECC) circuit configured to detect an error bit of first read data read from the memory device and invert the error bit;
   an error type detection logic configured to write first write data based on the inverted error bit to the memory device, and output stuck bit information based on second read data which is read the first write data; and
   a data patterning logic configured to change a bit pattern of input data which is received from a host based on the stuck bit information and output a second write data.

2. The memory controller of claim 1, wherein the data patterning logic is further configured to randomize the input data.

3. The memory controller of claim 2, wherein the data patterning logic is further configured to select a first randomized data among a plurality of a randomized data based on the stuck bit information.

4. The memory controller of claim 3, wherein data bits of the first randomized data include more data bits corresponding to a stuck bit than data bits of the first write data.

5. The memory controller of claim 1, wherein data bits of the second write data include at least one of a stuck bit.

6. The memory controller of claim 1, wherein the first read data is outputted based on a read command.

7. The memory controller of claim 1, wherein the first read data is configured to a codeword in which data bits and parity bits are combined.

8. The memory controller of claim 1, if a number of the error bit included in the first read data exceeds a threshold value, wherein the ECC circuit configured to invert the error bit.

9. The memory controller of claim 1, an error type detection logic further configured to generate the stuck bit information based on a result of performing a plurality of read and/or write operations of the memory device.

10. The memory controller of claim 1, wherein the memory device includes a phase change random access memory.

11. The memory controller of claim 1, wherein the memory device includes a three-dimensional (3D) memory cell array.

12. An operating method of a memory system, the operating method comprising:
    detecting an error bit of first read data read from a memory device and invert the error bit;
    writing first write data based on the inverted error bit to the memory device;
    outputting stuck bit information based on second read data which is read the first write data; and
    changing a bit pattern of input data which is received from a host based on the stuck bit information and output a second write data.

13. The operating method of claim 12, further comprising randomizing the input data.

14. The operating method of claim 13, further comprising selecting a first randomized data among a plurality of a randomized data based on the stuck bit information.

15. The operating method of claim 14, wherein data bits the first randomized data include more data bits corresponding to a stuck bit than data bits of the first write data.

16. The operating method of claim 13, wherein data bits of the second write data include at least one of a stuck bit.

17. The operating method of claim 12, wherein the first read data is outputted based on a read command.

18. The operating method of claim 12, wherein the first read data is configured to a codeword in which data bits and parity bits are combined.

19. The operating method of claim 12 further comprising, if a number of the error bit included in the first read data exceeds a threshold value, inverting the error bit.

20. The memory controller of claim 12 further comprising generating the stuck bit information based on a result of performing a plurality of read and/or write operations of the memory device.

* * * * *